United States Patent
Tardy et al.

(10) Patent No.: US 9,527,225 B2
(45) Date of Patent: Dec. 27, 2016

(54) PROCESS AND EQUIPMENT FOR MANUFACTURING A PLASTIC HOLLOW BODY FROM TWO SHEETS

(75) Inventors: Pierre-Francois Tardy, Compiegne (FR); Bjorn Criel, Sint-Martens-Lennik (BE); Jean-Claude Mur, Choisy au bac (FR); Serge Dupont, Vilvoorde (BE); Franck Bajor, Longueil Sainte Marie (FR)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 616 days.

(21) Appl. No.: 13/583,254

(22) PCT Filed: Mar. 4, 2011

(86) PCT No.: PCT/EP2011/053254
§ 371 (c)(1),
(2), (4) Date: Jan. 4, 2013

(87) PCT Pub. No.: WO2011/110480
PCT Pub. Date: Sep. 15, 2011

(65) Prior Publication Data
US 2013/0140730 A1    Jun. 6, 2013

(30) Foreign Application Priority Data

Mar. 8, 2010    (FR) .................................... 10 51669

(51) Int. Cl.
*B29C 51/02* (2006.01)
*B29C 35/00* (2006.01)
(Continued)

(52) U.S. Cl.
CPC ............ *B29C 35/00* (2013.01); *B29C 49/0047* (2013.01); *B29C 49/02* (2013.01); *B29C 49/04* (2013.01);
(Continued)

(58) Field of Classification Search
CPC .... B29C 49/64; B29C 51/02; B29C 2049/047; B29C 51/267
See application file for complete search history.

(56) References Cited

U.S. PATENT DOCUMENTS 3,520,962 A    7/1970    Schneider
3,663,672 A *  5/1972    Button et al. ....... B29C 49/0031
                                                              264/150
(Continued)

FOREIGN PATENT DOCUMENTS

CN          1668452 A         9/2005
DE    10 2007 030 369         1/2009
(Continued)

OTHER PUBLICATIONS

Combined Chinese Office Action and Search Report issued Apr. 15, 2014 in Patent Application No. 201180013280.4 with English Translation.
(Continued)

*Primary Examiner* — Galen Hauth
(74) *Attorney, Agent, or Firm* — Oblon, McClelland, Maier & Neustadt, L.L.P.

(57) ABSTRACT

A process for manufacturing a plastic hollow body by molding two sheets of molten plastic in a mold including two cavities, the process including: a) two molten plastic sheets are manufactured by extrusion of at least one stream of molten plastic and transverse cutting thereof; b) these sheets are introduced between the mold cavities; c) the mold is closed and the hollow body is manufactured by conform- (Continued)

Figure 1:
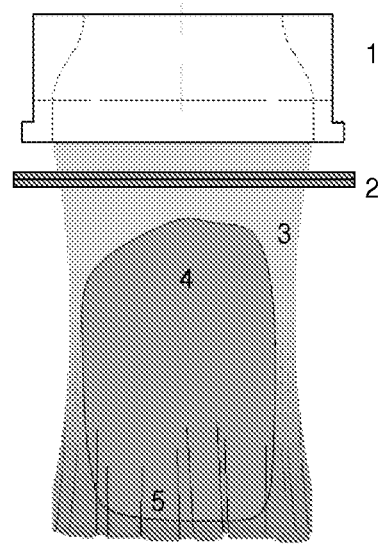

ing the two sheets to the mold cavities; d) the hollow body thus obtained is removed from the mold; e) all of operations a) to d) are repeated to manufacture another hollow body from two new sheets; and before, during, or after the transverse cutting operation, the lower portion of the two new sheets is cooled using a specific device that makes possible a local cooling of the sheets in the lower portion.

11 Claims, 2 Drawing Sheets

(51) Int. Cl.
*B29C 49/00* (2006.01)
*B29C 49/02* (2006.01)
*B29C 49/04* (2006.01)
*B29C 47/00* (2006.01)
*B29C 47/08* (2006.01)
*B29C 47/16* (2006.01)
*B29C 47/22* (2006.01)
*B29C 47/88* (2006.01)
*B29C 49/42* (2006.01)
*B29K 105/00* (2006.01)
*B29L 7/00* (2006.01)
*B29L 31/00* (2006.01)
*B29C 47/02* (2006.01)
*B29C 47/06* (2006.01)

(52) U.S. Cl.
CPC ........... *B29C 51/02* (2013.01); *B29C 47/0019* (2013.01); *B29C 47/0021* (2013.01); *B29C 47/0023* (2013.01); *B29C 47/0038* (2013.01); *B29C 47/0054* (2013.01); *B29C 47/0057* (2013.01); *B29C 47/0066* (2013.01); *B29C 47/021* (2013.01); *B29C 47/065* (2013.01); *B29C 47/0842* (2013.01); *B29C 47/16* (2013.01); *B29C 47/225* (2013.01); *B29C 47/884* (2013.01); *B29C 49/4278* (2013.01); *B29C 49/4284* (2013.01); *B29C 2049/0057* (2013.01); *B29C 2049/047* (2013.01); *B29C 2791/006* (2013.01); *B29C 2791/007* (2013.01); *B29C 2793/0063* (2013.01); *B29C 2793/0081* (2013.01); *B29K 2105/256* (2013.01); *B29K 2995/0069* (2013.01); *B29K 2995/0072* (2013.01); *B29L 2007/002* (2013.01); *B29L 2007/008* (2013.01); *B29L 2031/7172* (2013.01); *Y02P 70/267* (2015.11); *Y02P 70/275* (2015.11); *Y02P 70/279* (2015.11)

(56) References Cited

U.S. PATENT DOCUMENTS

| | | | |
|---|---|---|---|
| 3,955,697 A | | 5/1976 | Valyi |
| 4,657,625 A | | 4/1987 | Kawakami |
| 5,057,267 A | * | 10/1991 | Seizert et al. ............... 264/541 |
| 7,153,458 B2 | * | 12/2006 | Ide et al. ..................... 264/148 |
| 2005/0153008 A1 | * | 7/2005 | Cass .................. B29C 49/4817 425/182 |
| 2008/0029936 A1 | * | 2/2008 | Mehnert ................ B29C 49/04 264/523 |
| 2012/0205038 A1 | * | 8/2012 | Sumi et al. ............. 156/244.11 |
| 2013/0025778 A1 | | 1/2013 | Rohde et al. |

FOREIGN PATENT DOCUMENTS

| | | |
|---|---|---|
| EP | 0 056 120 A2 | 7/1982 |
| EP | 0 166 312 | 1/1986 |
| GB | 1 069 697 | 5/1967 |
| JP | 53-56261 A | 5/1978 |
| JP | 53-114868 | 10/1978 |
| JP | 60 157828 | 8/1985 |
| JP | 6-170931 A | 6/1994 |
| JP | 9-262897 A | 10/1997 |
| JP | 2002-103427 A | 4/2002 |
| WO | WO 2008/154988 A1 | 12/2008 |
| WO | WO 2009157197 A1 * | 12/2009 |

OTHER PUBLICATIONS

International Search Report Issued Apr. 18, 2011 in PCT/EP11/53254 Filed Mar. 4, 2011.
Office Action issued Feb. 2, 2015 in Japanese Patent Application No. 2012-556454 (with English language translation).

* cited by examiner

PROCESS AND EQUIPMENT FOR MANUFACTURING A PLASTIC HOLLOW BODY FROM TWO SHEETS

The present invention relates to a process for manufacturing a plastic hollow body, and in particular, a plastic fuel tank, from two sheets. It also relates to equipment suitable for said process.

Fuel systems on board vehicles of various types generally comprise devices for the ventilation of hydrocarbons contained in the tank. They may also include devices for supplying the engine with fuel. Such devices form the link between elements contained in the tank (valves, fuel pump, etc.) and elements positioned outside the tank (canister, fill pipe, etc.). The penetration through the wall of the tank must take into account the sealing requirements laid down by current environmental standards (LEV II and PZEV for example). For this purpose, the reduction in the number and size of the openings in the wall of the tank constitutes a favourable factor in reducing evaporative losses. However, this makes it more difficult to insert components into the tank and to position them therein.

Application EP 1110697 in the name of the Applicant discloses a process for moulding a fuel tank using a parison in several parts so as to be able to insert the accessories into the tank at the same time as it is moulded. For this purpose, a tubular parison is extruded, then, on exiting the die, two longitudinal cuts are made in it, along two opposed generatrices. This document recommends the use of a device for guiding and separating the two parison parts thus obtained, in order to be able to introduce the accessories into the tank at the same time as it is moulded.

Ideally, this device should also make it possible to substantially flatten the two parison parts and keep them free of creases so as to be able to apply them correctly between the mould cavities. This may be carried out using straight cylindrical rollers or rolls, spaced as required. This simple (and theoretically adequate) technique has, however, the disadvantage that the sheets obtained on exiting the rolls remain, after all, curved and that their relative position cannot be well controlled. This is because the plastic begins to set (solidify) as soon as it exits the die and tends to remain in the shape that the die gave to it.

Moreover, these sheets hang freely between the cavities of the mould before it is closed in order to mould the FT and hence creases may form again at this stage. This phenomenon is even more marked when the thickness of the sheets is uneven and when the sheets are long. It is in particular significant when the sheets have a thickness that has been intentionally varied in a controlled manner. This phenomenon is responsible for a significant percentage of waste (scraps) and therefore adversely affects the profitability of industrial processes.

Application WO 2008/040766 in the name of the Applicant proposes to solve this problem by guiding the free end of the sheets (which hangs by gravity between the mould cavities) via jaws or clamps (preferably made of cooled or PTFE-coated metal, for example) enabling them to be flattened out and preventing the formation of creases. Such a device must however be started up at each cycle, when the sheets are inserted between the mould cavities. Automatic (robotic) devices may be used for this purpose, but these are generally relatively complex and expensive.

Application WO 2009/007384, also in the name of the Applicant, discloses a process that makes it possible to solve this problem using a smoothing device which starts up automatically when the mould is closed. In this process, when the mould is closed, a device that is attached to this mould automatically stretches the sheets sideways and/or smoothes the sheets (i.e. tautens them, flattens them). The drawbacks of this process are, on the one hand, the fact that it is necessary to provide quite a long supplementary parison length and, on the other hand, the fact that each mould (specific to a given tank/a given series of vehicles) must be equipped with said device, which is consequently lost during a series change.

The objective of the present invention is to provide a process that aims to reduce or even eliminate these drawbacks while also being even more effective in the removal of creases in the bottom of the sheets.

For this purpose, the present invention relates to a process for manufacturing a plastic hollow body by moulding two sheets of molten plastic in a mould comprising two cavities, said process comprising the following steps:

a) two molten plastic sheets are manufactured by extrusion of at least one stream of molten plastic and transverse cutting thereof;

b) these sheets are introduced between the mould cavities;

c) the mould is closed and the hollow body is manufactured by conforming the two sheets to the mould cavities;

d) the hollow body thus obtained is removed from the mould;

e) all of operations a) to d) are repeated in order to manufacture another hollow body from two new sheets, characterized in that: before, during or after the transverse cutting operation, the lower portion of the two new sheets is cooled using a specific device that makes possible a local cooling of the sheets in said lower portion.

The process according to the invention is suitable for any hollow body and, in particular, for any hollow body inside of which it is desired to introduce at least one accessory. It advantageously applies to the manufacture of fuel tanks (FTs). The term "fuel tank" is understood to mean an impermeable tank that can store fuel under diverse and varied environmental and usage conditions. An example of this tank is that with which motor vehicles are equipped. In the remainder of the description, the terms "hollow bodies" and "tanks" are used interchangeably.

The hollow body obtained by the process according to the invention is made with a plastic wall, generally comprising an internal face on its concave portion and an external face on its convex portion.

The term "plastic" is understood to mean any material comprising at least one synthetic resin polymer.

All types of plastic may be suitable. Particularly suitable are plastics that belong to the category of thermoplastics.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, non-limitingly: random copolymers, linear block copolymers, non-linear block copolymers, and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersity of their molecular weight.

In particular, polyolefins, thermoplastic polyesters, polyketones, polyamides and copolymers thereof may be used. A blend of polymers or copolymers may also be used; similarly it is also possible to use a blend of polymer materials with inorganic, organic and/or natural fillers such as, for example but non-limitingly: carbon, salts and other inorganic derivatives, natural fibres or polymer fibres. It is also possible to use multilayer structures consisting of stacked layers bonded together, comprising at least one of the polymers or copolymers described above.

One polymer often used for fuel tanks is polyethylene. Excellent results have been obtained with high-density polyethylene (HDPE).

Preferably, the hollow body for which the process according to the invention is intended has a multilayer structure comprising at least one layer of a thermoplastic and at least one additional layer which, advantageously, may consist of a material that is a barrier to liquids and/or gases.

Preferably, the nature and the thickness of the barrier layer are chosen so as to minimize the permeability of the liquids and gases in contact with the wall of the hollow body. Preferably, in the case of a fuel tank, this layer is based on a barrier material, i.e. a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The present invention applies well in the case of HDPE fuel tanks that have an EVOH barrier layer.

According to the invention, a tank is moulded from two sheets of molten plastic. These sheets may have been obtained by extrusion through two flat dies, preferably just before the moulding of the hollow body (to avoid having to reheat/melt them). However, more preferably, these sheets are obtained by longitudinally cutting a parison, which preferably has a variable thickness.

The term "parison" is understood to mean an extruded preform of any shape, generally substantially cylindrical or tubular, which is intended to form the wall of the tank after moulding.

According to this variant of the invention, the tubular parison has to be converted into two sheets, i.e. it has to undergo at least one transverse cutting operation and two longitudinal cutting operations, generally along two opposing generatrices (at 180° to one another).

The longitudinal cutting operations are generally carried out either using two blades which may or may not be attached to (fixed onto) the extrusion die, or be carried out inside the die itself. The latter variant is preferred as it makes it possible to automate the process as much as possible and to facilitate the stopping/starting of production runs. In this variant, preferably, the parison is first cut using flow dividers integrated into the die and then the two cut portions of the parison are gradually flattened due to a gradual modification of the inner passage of the die through which the stream or streams of plastic of the parison flow. This variant is the subject of the aforementioned Application WO 2008/040766, the content of which is, for this purpose, incorporated by reference into the present application.

Preferably, the parison has an adjustable thickness (i.e. one that can be varied, in a controlled manner, longitudinally (along a generatrix) and/or transversely (over the same section)) using at least one known device such as a WDS (vertically displaceable core), a PWDS (deformable ring), an SFDR (machined core of variable profile or pin of variable shape) or a "die slide" (part inserted locally into the die: see U.S. Pat. No. 5,057,267 in the name of the Applicant), integrated into the die. With respect to moulding a parison of constant thickness, this way of proceeding makes it possible to take into account the reduction in thickness that occurs during moulding (and in particular, blow moulding) at certain places in the parison, as a result of the non-constant deformation levels of the material in the mould.

When sheets (parison already cut longitudinally and partially flattened) are obtained at the die outlet, their handling and their transfer to the mould are markedly easier. It is therefore possible to reduce the height required between the die outlet and the mould cavities. This will reduce the dwell time of the extruded material in the ambient air and thus will increase the temperature of the sheets, which will facilitate the subsequent moulding process, in particular when this comprises a step of fastening component(s) (accessory or accessories) to the inside of the parison, onto its inner face, before the final moulding of the hollow body.

According to the invention, the sheets are cut transversely (perpendicular to their extrusion direction) using a suitable cutting device (blades). This cutting operation preferably takes place as rapidly as possible (typically: in less than one second) and using moveable blunt objects (blades), the actuators (in general cylinder actuators) of which are preferably located far from the sheets (which are hot and release heat, which would necessitate thermal insulation and/or cooling of said actuators if they were too close). Very particularly preferably, the transverse cutting operation is carried out using blades which have a cutting surface that finishes in a substantially horizontal tip (i.e. having hence the shape of an horizontal line); there generally are two blades per sheet, which preferably have a width substantially equal to that of the sheets and a size, position and movement such that the tips of their cutting surfaces substantially meet at the centre of the stream of molten plastic.

The transfer of the sheets (stream of material cut both longitudinally and transversely) to the mould may take place in any known manner. However, according to one preferred variant, the mould cavities are positioned underneath the die and the parison (sheets) is/are extruded continuously between the cavities of the mould that is then closed over said sheets just before they are cut transversely and moulded.

In the process according to the invention, a cooling device specifically cools the lower portion of the sheets (the temperature of the remainder of the sheets not being significantly affected by said device) before, during or after the transverse cutting of the streams or stream of molten plastic from which they result. The expression "lower portion" is understood to mean a strip having a height in the range of the cm (the smallest height possible in fact, so as not to waste too much material, but high enough so that the stiffening effect is sufficient; typically, a strip of about 3 to 5 cm gives good results) and which is located substantially within the lower edge of the sheets. Preferably, this strip is completely within the lower edge, but this variant is only possible in practice when the cooling takes place after the cutting operation as explained in greater detail below.

The local cooling device used in the invention may be of any known type, generally that uses a coolant and that may or may not be in direct contact with the parison. Devices of the second type may, for example, consist of bars (generally at least two, intended to cool the sheets over their two outer surfaces) comprising orifices through which a cooling gas (e.g. air) is blown over the parison. Devices of the first type (which are preferred) may consist of hollow bars, or any other type of hollow device, in which a coolant (generally water) preferably flows and which preferably has a surface conditioning such that it allows direct contact with the sheets without causing the bonding thereof. A fluoropolymer (PTFE-type) coating gives good results.

The cooling time and temperature are generally such that the sheet, which typically has a temperature of about 160 to 190° C. at the outlet of the extruder, reaches in the set strip, a temperature of about 60 to 90° C. Water at a temperature between 5 and 20° C., typically between 10 and 15° C., makes it possible to achieve this easily, even in the case where the movement of the blades and that of the bars is coupled (see below).

Given the rate at which the stream of material is discharged from the extruder, the direct contact between the bars and the sheets should be limited in time if said bars are immobile. Hence, according to one preferred variant of the invention, the bars can be moved during the cooling either by rotation (i.e. they rotate on themselves in fact, with no absolute movement in space) or by a linear movement following that of the stream of molten plastic. It is understood that blades and bars are also moveable in a direction perpendicular to the extrusion in order to be placed in an "active" position (for the cutting and the cooling) or in a stand-by position (to allow the extrusion of the following sheets).

The cooling device used in the invention is preferably located above the blades and its movement is either connected to that of the blades (i.e. the movement of the two devices is controlled by one and the same actuator), or it is controlled by a specific actuator (an independent actuator, i.e. the movement of the cooling device is controlled by an actuator different from that of the blades). The latter variant is preferred. It makes it possible, in particular, to carry out the cooling after the cutting, which is advantageous knowing that, as a result of the elasticity of the material, this material generally rises back up towards the die after cutting and it is then advantageous to use the cooling device to clamp the lower edges of the new sheets while cooling them and following the movement thereof, which prevents too much material from being lost.

In the process according to the invention, the tank is preferably moulded as a single part (in a single step, after which a one-piece tank is obtained, without recourse to an additional step of assembling separate shells), generally by welding the sheets over their perimeter when the mould is closed. In particular, the tank is advantageously moulded by:
blow-moulding, i.e. by expanding the cut parison and pressing it against the mould cavities using a pressurized fluid (as described in Application EP 1110697, the content of which is for this purpose incorporated by reference into the present application);
thermoforming the parison, i.e. by pressing the latter against the mould cavities, for example by providing suction (creating a vacuum) behind said cavities.

Preferably, the tank is moulded by blow-moulding. This is because thermoforming generally involves heating the mould at a high temperature so as to be able to achieve deep deformations (corners of the tank for example, where the parison is highly stretched). This results in cycle times that are longer than with blow moulding, in which this constraint does not exist.

The process according to the invention may involve the use of a core which is used during a first closure of the mould to fasten accessories to the inner surface of the sheets. In this variant, there is preferably a device that prevents the edges of the sheets from being welded together during this first mould closure (when the parison is pressed against the cavities in order to fasten the accessories to the parison). This device is advantageously integrated into the core. Hence, this core is preferably an insert having a suitable shape and size for being able to be partly (generally, over at least one portion of its periphery) inserted between the sheets to be welded. To facilitate the welding, the mould cavities are advantageously equipped with a thermal control device that makes it possible to heat the weld zone during the steps relating to the first mould closure (in order to attach one or more components thereto), where appropriate.

The core may also integrate such a (thermal control) device in its zone(s) of contact with the parison, and this, in particular, in the aforementioned weld zone. This variant could further improve the quality of the welding of the tank (by reducing the inner bead and therefore by improving the impact resistance of the tank). Such a device is for example described in Application FR 04 13407 in the name of the Applicant, the content of which is, for this purpose, incorporated by reference into the present application.

In this variant of the process according to the invention, during the first closure of the mould the sheets are first pressed against the mould cavities (by blowing through the core and/or applying suction behind the cavities) and then devices on the core (for example, cylinder actuators, hydraulic rams . . . ) fasten the accessories to the pressed sheets. Next, the mould is re-opened, the core is removed and the mould is resealed to weld the pre-moulded sheets and produce the tank by a final blow-moulding operation.

The present invention also relates to equipment for implementing the process as described above. This equipment comprises two moveable blades and two cooling bars that are also moveable, the blades and the bars having a geometry suitable for being able, respectively, to transversely cut a stream of molten plastic, and to cool the lower portion of the sheets before, during or after the cutting thereof.

Generally, this equipment also comprises an extruder and a mould. Preferably, the above mentioned blades and bars are fixed either to the extruder (and preferably, to the extrusion head ((or die) thereof) or the mould, the first alternative being preferred.

All the preferred features described above in the section of the description relating to the process can be applied for this equipment.

Figure 2:
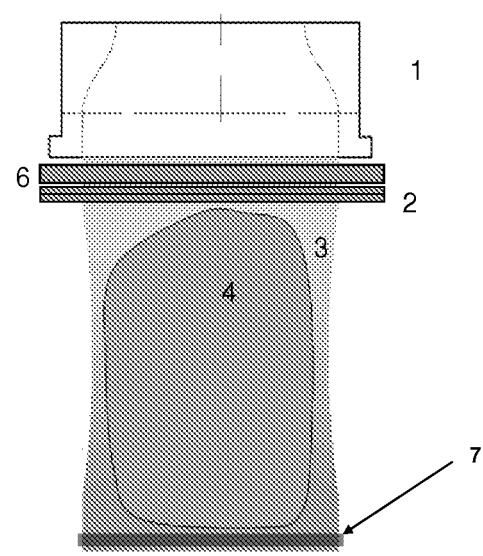
Figure 3:
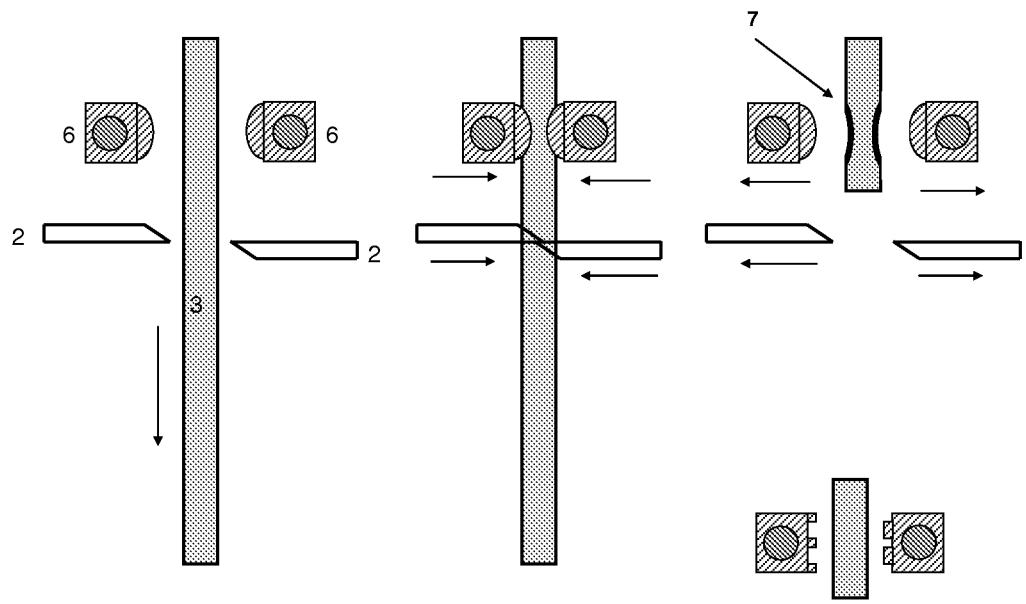
Figure 4:
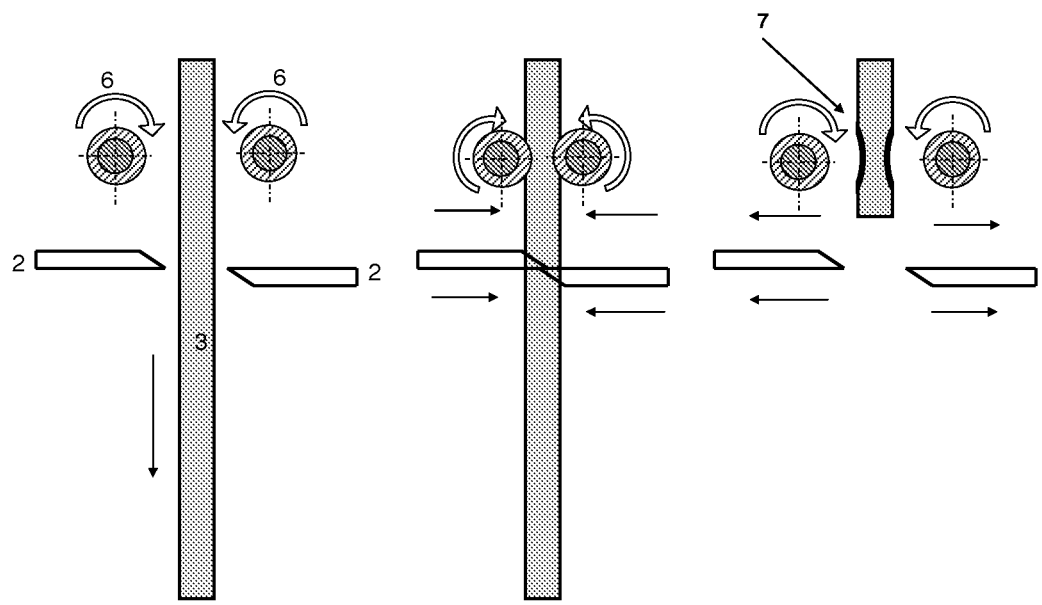

The objective of FIGS. 1 to 4 is to illustrate certain concrete aspects of the invention, without wishing to restrict the scope thereof in any way. They illustrate schematic views, respectively:

FIG. 1: of a process and equipment according to the prior art (without smoothing), front view;

FIG. 2: of a process and equipment according to the invention, front view also;

FIG. 3: of a section through a vertical plane perpendicular to one of the sheets illustrated in FIG. 2, and also the cutting and cooling steps according to one preferred variant of the invention;

FIG. 4: of a section through a vertical plane perpendicular to one of the sheets illustrated in FIG. 2, and also the cutting and cooling steps according to another preferred variant of the invention.

In these figures, identical numbers represent identical components, namely:
1. an extrusion die;
2. blades for the transverse cutting of the sheets;
3. the sheets;
4. the cavities of a mould;
5. creases in the parison;
6. cooling bars; and
7. a strip of set material in the lower portion of the sheets to be moulded, which hang by gravity between the mould cavities.

FIGS. 1 and 2 illustrate how obtaining a strip of set material (7) in the bottom of the sheets (3) makes it possible to prevent the presence of creases (5) in this zone.

FIG. 3 illustrates a variant according to which the sheet exiting the extruder is cut and cooled at the same time over a horizontal strip (7), respectively using blades (2) that meet in the middle of the sheet (typically in less than one second), and fixed bars (6), the contact time of which with the bottom of the following sheets is limited to prevent the formation of horizontal creases upstream (if too much material discharged by the extruder accumulates).

Two different bars geometries are illustrated in FIG. 3, the one in the lower corner right being preferred over the one pictured above because it has a larger exchange surface and is more rigid design.

FIG. 4 illustrates another variant according to which the bars (6) are rotatably moveable in order to follow the rate of extrusion.

In FIGS. 3 and 4, the direction of the movements is indicated by arrows and the following three phases are represented: on the left, the positioning of the blades (2) and of bars (6) opposite the cutting and cooling locations respectively; in the middle: the moment when the blades (2) come together to make the cut, during which the bars (6) cool a portion of the stream of material upstream by contact; on the right: the withdrawal of the blades (2) and of the bars in order to allow the extrusion of the following sheets, which are provided with a strip (7) of set material.

The invention claimed is:

1. A process for manufacturing a plastic hollow body by molding two sheets of molten plastic in a mold including two cavities, the process comprising:
   a) manufacturing two molten plastic sheets by extrusion of at least one stream of molten plastic, the molten plastic sheets being extruded continuously;
   b) introducing the two sheets between the mold cavities;
   c) closing the mold, transverse cutting the two sheets of molten plastic while the mold is closed and manufacturing the hollow body by conforming the two sheets to the mold cavities, the transverse cutting of each sheet being carried out by two blades that move toward each other;
   d) removing the hollow body thus obtained from the mold; and
   e) repeating all of operations a) to d) to manufacture another hollow body from two new sheets,
   wherein before, during, or after the transverse cutting operation, a lower portion of the two new sheets is cooled using a specific cooling device that makes possible a local cooling of the sheets in the lower portion, and
   wherein the transverse cutting operation is carried out using blades that have a cutting surface that finishes in a substantially horizontal tip, use being made of two blades per sheet, which have a width substantially equal to that of the sheets and a size, position, and movement such that tips of their cutting surfaces substantially meet at a center of the stream of molten plastic.

2. A process according to claim 1, wherein the two sheets are obtained by longitudinally cutting a parison that has a variable thickness.

3. A process according to claim 1, wherein the cooling takes place by direct contact with the cooling device that has a surface conditioning.

4. A process according claim 3, wherein the cooling device is firmly attached to the blades carrying out the transverse cutting operation.

5. A process according to claim 1, wherein the cooling device is moved by an actuator, movement of the cooling device and that of the blades being controlled by different actuators.

6. A process according to claim 1, wherein the cooling device comprises two bars per sheet.

7. A process according to claim 6, wherein the bars can be moved either by rotation or by a linear movement following that of the stream of molten plastic.

8. A process according to claim 7, wherein the cooling takes place after the cutting and the cooling device is used to clamp lower edges of the new sheets while cooling them and following movement thereof.

9. Equipment for manufacturing a plastic hollow body by molding two sheets of molten plastic, comprising:
   an extrusion die configured to extrude a continuous stream of sheets of molten plastic;
   a mold having two cavities; and
   two moveable blades and two cooling bars that are also moveable, the blades being configured to move toward each other, the blades and the bars having a geometry configured, respectively, to transversely cut a stream of the sheets of molten plastic, and to cool the lower portion of the two sheets before, during, or after the transverse cutting operation,
   wherein the two moveable blades have a cutting surface that finishes in a substantially horizontal tip, use being made of two blades per sheet, which have a width substantially equal to that of the sheets and a size, position, and movement such that tips of their cutting surfaces substantially meet at a center of the stream of the sheets of the molten plastic.

10. A process for manufacturing a plastic hollow body by molding two sheets of molten plastic in a mold including two cavities, the process comprising:
    a) manufacturing two molten plastic sheets by extrusion of at least one stream of molten plastic;
    b) introducing the two sheets between the mold cavities;
    c) closing the mold, transverse cutting the two sheets of molten plastic while the mold is closed and manufacturing the hollow body by conforming the two sheets to the mold cavities;
    d) removing the hollow body thus obtained from the mold; and
    e) repeating all of operations a) to d) to manufacture another hollow body from two new sheets,
    wherein before, during, or after the transverse cutting operation, a lower portion of the two new sheets is cooled using a specific cooling device that makes possible a local cooling of the sheets in the lower portion,
    wherein a movement of the cooling device is independent from a movement of the mold, and
    wherein the transverse cutting operation is carried out using blades that have a cutting surface that finishes in a substantially horizontal tip, use being made of two blades per sheet, which have a width substantially equal to that of the sheets and a size, position, and movement such that tips of their cutting surfaces substantially meet at a center of the stream of molten plastic.

11. Equipment for manufacturing a plastic hollow body by molding two sheets of molten plastic, comprising:
    a mold having two cavities; and two moveable blades and two cooling bars that are moveable with respect to the mold, the blades and the bars having a geometry configured, respectively, to transversely cut a stream of molten plastic, and to cool the lower portion of the two sheets before, during, or after the transverse cutting operation, wherein the two moveable blades have a cutting surface that finishes in a substantially horizontal tip, use being made of two blades per sheet, which have a width substantially equal to that of the sheets and a size, position, and movement such that tips of their cutting surfaces substantially meet at a center of the stream of the sheets of the molten plastic.

* * * * *